(12) United States Patent
Pascual et al.

(10) Patent No.: US 11,349,884 B2
(45) Date of Patent: May 31, 2022

(54) METHOD AND A SIP PROXY FOR MANAGING CALLS IN A VOICE OVER SIP NETWORK

(71) Applicant: Orange, Paris (FR)

(72) Inventors: Juan Pascual, Issy-les-Moulineaux (FR); Stéphane Fouquet, Suresnes (FR); Miguel Labranche, Bonneuil-sur-Marne (FR)

(73) Assignee: ORANGE, Paris (FR)

( * ) Notice: Subject to any disclaimer, the term of this patent is extended or adjusted under 35 U.S.C. 154(b) by 112 days.

(21) Appl. No.: 16/059,752

(22) Filed: Aug. 9, 2018

(65) Prior Publication Data

US 2019/0052678 A1 Feb. 14, 2019

(30) Foreign Application Priority Data

Aug. 10, 2017 (FR) ...................................... 1757622

(51) Int. Cl.
*H04L 29/06* (2006.01)
*H04M 7/00* (2006.01)
(Continued)

(52) U.S. Cl.
CPC ...... *H04L 65/105* (2013.01); *H04L 29/06027* (2013.01); *H04L 61/2528* (2013.01);
(Continued)

(58) Field of Classification Search
CPC .............. H04L 65/105; H04L 65/1073; H04L 61/2528; H04L 29/06027; H04L 65/1069;
(Continued)

(56) References Cited

U.S. PATENT DOCUMENTS 7,496,192 B1 * 2/2009 Sylvain ............... H04M 7/0027
370/352
7,519,075 B2 * 4/2009 Tu ..................... H04L 29/06027
370/392
(Continued)

FOREIGN PATENT DOCUMENTS

WO     WO 2008/071891 A1     6/2008

OTHER PUBLICATIONS

French Search Report dated Mar. 28, 2018 for French Application No. 1757622.

(Continued)

*Primary Examiner* — Jamal Javaid
*Assistant Examiner* — Thad N Defauw
(74) *Attorney, Agent, or Firm* — Knobbe, Martens, Olson & Bear, LLP

(57) ABSTRACT

A method is provided of managing calls in a voice over IP network, and is performed by a SIP proxy. The method includes receiving a registration request issued by a voice over IP terminal to register with the SIP proxy, obtaining from a database the address of at least one voice over IP platform associated with the voice over IP terminal, registering the SIP proxy with a said voice over IP platform, and sending a request to a number portability server suitable for managing incoming calls to said voice over IP terminal, the request requesting the server to associate the telephone number of the voice over IP terminal with a routing prefix associated with the voice over IP platform.

14 Claims, 4 Drawing Sheets

(51) Int. Cl.
    *H04L 29/12*     (2006.01)
    *H04L 65/1045*     (2022.01)
    *H04L 65/10*     (2022.01)
    *H04L 65/1069*     (2022.01)
    *H04M 3/42*     (2006.01)
    *H04L 65/1073*     (2022.01)
    *H04L 65/1101*     (2022.01)
    *H04L 61/2521*     (2022.01)

(52) U.S. Cl.
    CPC ...... *H04L 65/1006* (2013.01); *H04L 65/1069* (2013.01); *H04L 65/1073* (2013.01); *H04M 3/42297* (2013.01); *H04M 7/006* (2013.01)

(58) Field of Classification Search
    CPC .......... H04L 65/1006; H04M 3/42297; H04M 7/006
    See application file for complete search history.

(56) References Cited

U.S. PATENT DOCUMENTS

| | | | |
|---|---|---|---|
| 2003/0007482 A1* | 1/2003 | Khello | H04L 29/1216 370/352 |
| 2003/0123432 A1 | 7/2003 | Cheng et al. | |
| 2004/0160947 A1* | 8/2004 | Hardy | H04L 61/2514 370/352 |
| 2008/0144605 A1* | 6/2008 | Qiu | H04M 7/0084 370/352 |
| 2010/0128861 A1* | 5/2010 | Vendrow | H04M 3/2254 379/114.01 |

OTHER PUBLICATIONS

"Portabilite Des Numeros Mobiles—Routage direct du trafic vers les numéros mobiles portés", ARCEP, Nov. 9, 2007, PowerPoint downloaded from https://www.arcep.fr/fileadmin/reprise/dossiers/pnm/Pres-PNM-091107.pdf.

* cited by examiner

METHOD AND A SIP PROXY FOR MANAGING CALLS IN A VOICE OVER SIP NETWORK

CROSS-REFERENCE TO RELATED APPLICATIONS

This application claims priority to French Patent Application FR 1757622, filed Aug. 10, 2017, the disclosure of which is incorporated herein by reference in its entirety.

BACKGROUND

Embodiments described herein relate to the field of backing up communications networks, and more particularly to the field of backing up voice over internet protocol (IP) networks.

In the current state of the art for voice over IP networks, voice over IP terminals or IP private branch telephone exchanges (IPBXs) access the voice over IP network via a voice over IP platform with which they are registered, with the platform being chosen by the operator when the user takes out the subscription to the voice over IP service.

In order to avoid an interruption in telephone service in the event of a failure of the voice over IP platform, operators generally provide a backup mechanism consisting in routing calls via the public switched telephone network (PSTN) or over the integrated services digital network (ISDN).

Embodiments described herein provide another solution for backing up voice over IP networks.

SUMMARY

More precisely, some embodiments provide a call management method for managing calls in a voice over IP network, the method being performed by a SIP proxy and comprising:
- a receiving step for receiving a registration request issued by a voice over IP terminal to register with said SIP proxy;
- an obtaining step for obtaining from a database the address of at least one voice over IP platform associated with said terminal;
- a registration step for registering the SIP proxy with a said voice over IP platform; and
- a sending step for sending a request to a number portability server configured to manage incoming calls to said voice over IP terminal, which request requests the server to associate the telephone number of the voice over IP terminal with a routing prefix associated with the voice over IP platform.

Correspondingly, some embodiments provide a SIP proxy comprising:
- a receiving module for receiving a registration request issued by a voice over IP terminal to register with said SIP proxy;
- an obtaining module for obtaining from a database the address of at least one voice over IP platform associated with the IP terminal;
- a registration module for registering said SIP proxy with a said voice over IP platform; and
- a sending module for sending a request to a number portability server configured to manage incoming calls to said voice over IP terminal, which request requests said server to associate the telephone number of the voice over IP terminal with a routing prefix associated with the voice over IP platform.

Some embodiments thus provide a solution for defining the voice over IP platform used by a voice over IP terminal. In order to allocate a voice over IP platform dynamically to a terminal and in order to ensure that incoming calls are routed to the terminal, certain embodiments propose associating the telephone number of the terminal in a number portability server with a unique routing prefix corresponding to that platform.

For further information about the number portability service, the person skilled in the art may refer to the following documents:
1) The presentation "PORTABILITE DES NUMEROS MOBILES" by the Autorite de Regulation des Communications Electroniques et des Postes (ARCEP); and
2) The Wikipedia article on "Local number portability."

In a particular implementation, during said obtaining step, the SIP proxy obtains from the above-mentioned database the address of a nominal voice over IP platform and the address of at least one backup voice over IP platform, these platforms being associated with the terminal, and the step for registering the SIP proxy is performed in preferred manner with the nominal voice over IP platform, and in the event of a failure, with one of said backup voice over IP platforms in a priority order associated with the backup platforms.

Embodiments described herein thus make it possible to backup a voice over IP network by enabling a voice over IP terminal to communicate dynamically with a plurality of voice over IP platforms. This improves the voice over IP service via a redundancy mechanism in the event of a platform failing, and provides possibilities for dynamically sharing traffic in order to respond to problems of loading.

In a particular implementation, the method includes:
- a detection step for detecting a fault affecting the VoIP platform with which said proxy device is registered;
- a registration step for registering said SIP proxy with one of the backup voice over IP platforms in the above-mentioned priority order; and
- a sending step for sending a request to the number portability server requesting the server to associate the telephone number of the voice over IP terminal with a routing prefix associated with the backup voice over IP platform.

In a particular implementation, the method also includes:
- a detection step for detecting a state of normal operation of said nominal voice over IP platform;
- a waiting step for waiting until the proxy device is no longer managing a call; and
- a sending step for sending a request to the number portability server requesting the server to associate the telephone number of the voice over IP terminal with a routing prefix associated with the nominal voice over IP platform.

The method performed by the proxy device of some embodiments also serves to route incoming and outgoing voice over IP calls.

In particular, in a particular implementation, the method includes:
- a routing step for routing to the voice over IP terminal an incoming call for that terminal as received from the voice over IP platform with which said proxy device is registered.

Likewise, in a particular implementation, the method includes:
- a receiving step for receiving a call issued by said voice over IP terminal; and
- a routing step for routing said call to the VoIP platform with which said proxy device is registered.

In a particular implementation, the various steps of the call management method are determined by computer program instructions.

Consequently, embodiments described herein also provide a computer program on a data medium, the program including instructions adapted to performing steps of a call management method.

The program may use any programming language and be in the form of source code, object code, or code intermediate between source code and object code, such as in a partially compiled form, or in any other desirable form.

Embodiments described herein also include a computer-readable data medium including instructions of a computer program as mentioned above.

The data medium may be any entity or device capable of storing the program. For example, the medium may comprise storage capability such as a read only memory (ROM), e.g. a compact disk (CD) ROM, or a microelectronic circuit ROM, or indeed magnetic recording capability, e.g. a hard disk.

The data medium may also be a transmissible medium such as an electrical or optical signal suitable for being conveyed via an electrical or optical cable, by radio, or by any other suitable structure or method. The program may in particular be downloaded from an Internet type network.

Alternatively, the data medium may be an integrated circuit in which the program is incorporated, the circuit being adapted to execute or to be used in the execution of any of the method in question.

BRIEF DESCRIPTION OF THE DRAWINGS

Other characteristics and advantages of the embodiments described herein appear from the following description made with reference to the accompanying drawings, which show an implementation having no limiting character. In the figures.

DETAILED DESCRIPTION

Figure 1:
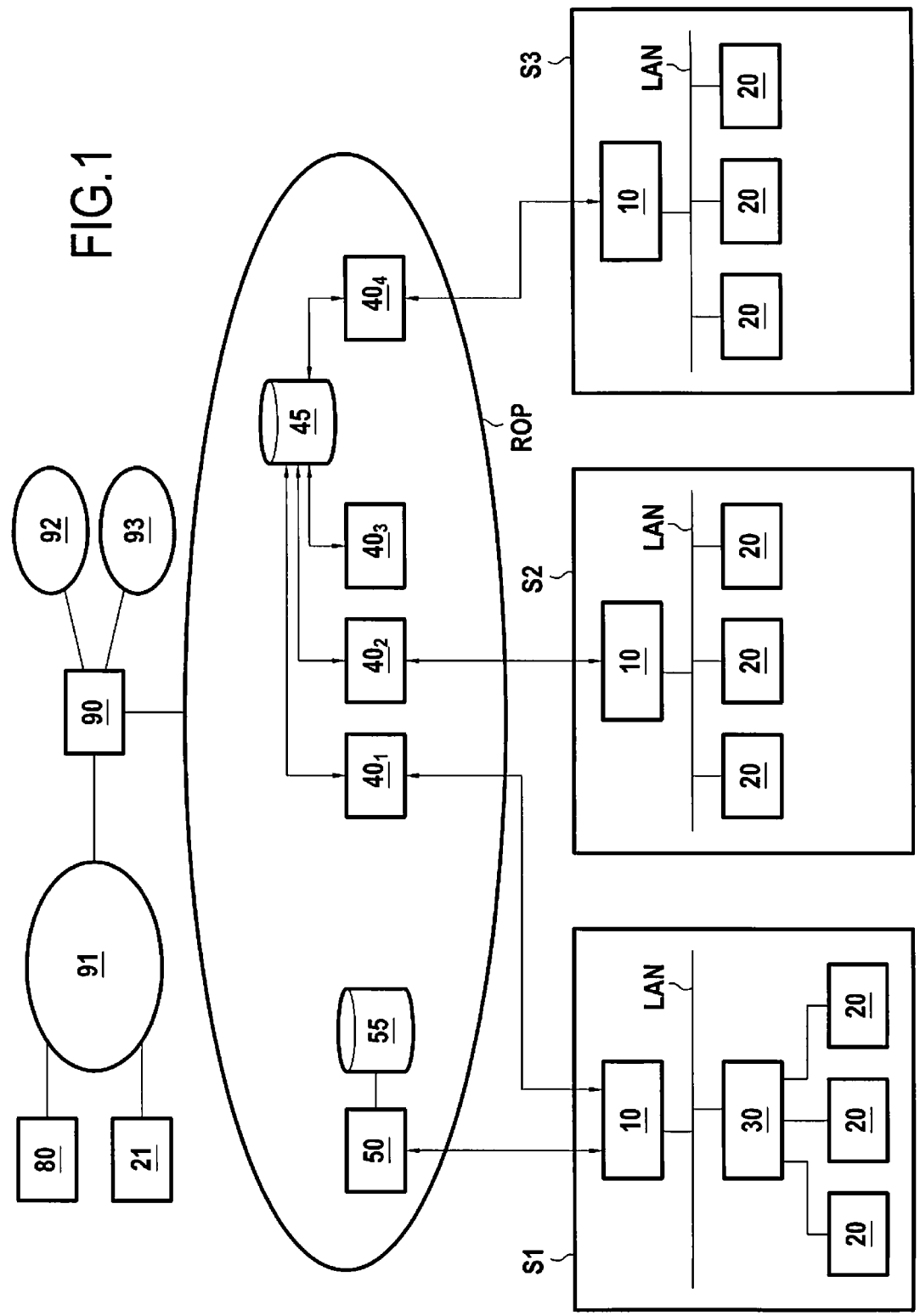
FIG. 1 shows a network in which embodiments described herein can be implemented.

FIG. 1 shows a network in which embodiments described herein can be implemented.

The network has three sites S1, S2, and S3, each of which has a proxy device 10 in accordance with embodiments described herein.

In the site S1, three voice over IP terminals 20 are directly to an Internet protocol private branch exchange (IPBX) 30, this exchange being connected to the proxy device 10 of embodiments described herein via a local area network (LAN).

In the sites S2 and S3, three voice over IP terminals 20 and the proxy device 10 of embodiments described herein are interconnected via respective LANs.

For each of the sites S1 to S3, the proxy device 10 may be integrated in any piece of equipment of the LAN, e.g. in the IPBX 30, in a SIP terminal 20, or in a router for interconnection with the operator's session initiation protocol (SIP) network for voice over IP, referenced OPNet below. This router may in particular be a home gateway suitable for delivering telephone, television, and Internet access services to the terminals 20.

The SIP voice over IP (VoIP) network OPNet of the operator has a plurality of VoIP platforms $40_i$, each of which is configured to access a common user database 45.

In this embodiment, the user database 45 associates each SIP user with a nominal VoIP platform and with at least one backup VoIP platform. It also includes information about each user, in particular that user's authentication data AUTH (identifier and password).

The operator's voice over IP SIP network OPNet also includes an application number portability server (NPS) 50 that is configured to access an NPS database 55. The NPS database 55 contains the list of all of the telephone numbers of the subscribers of the operator of the network OPNet.

For each subscriber, that subscriber's telephone number is associated with a unique routing prefix that is specific to the voice over IP platform 40 with which the voice over IP terminal 20 of that subscriber can communicate. FIG. 1 is simplified in this respect, however all of the proxy devices 10 are configured to be capable of communicating with the NPS server 50.

In this example, the operator's voice over IP SIP network OPNet is connected to a gateway 90 providing interconnection between this network OPNet and another network, e.g. another voice over IP SIP telephone network 91, a mobile telecommunications network 92, or an ISDN user part (ISUP) network 93.

In the presently-described embodiment, the voice over IP SIP telephone network 91 includes an answer-back server 80 and voice over IP terminals 21.

Figure 2:
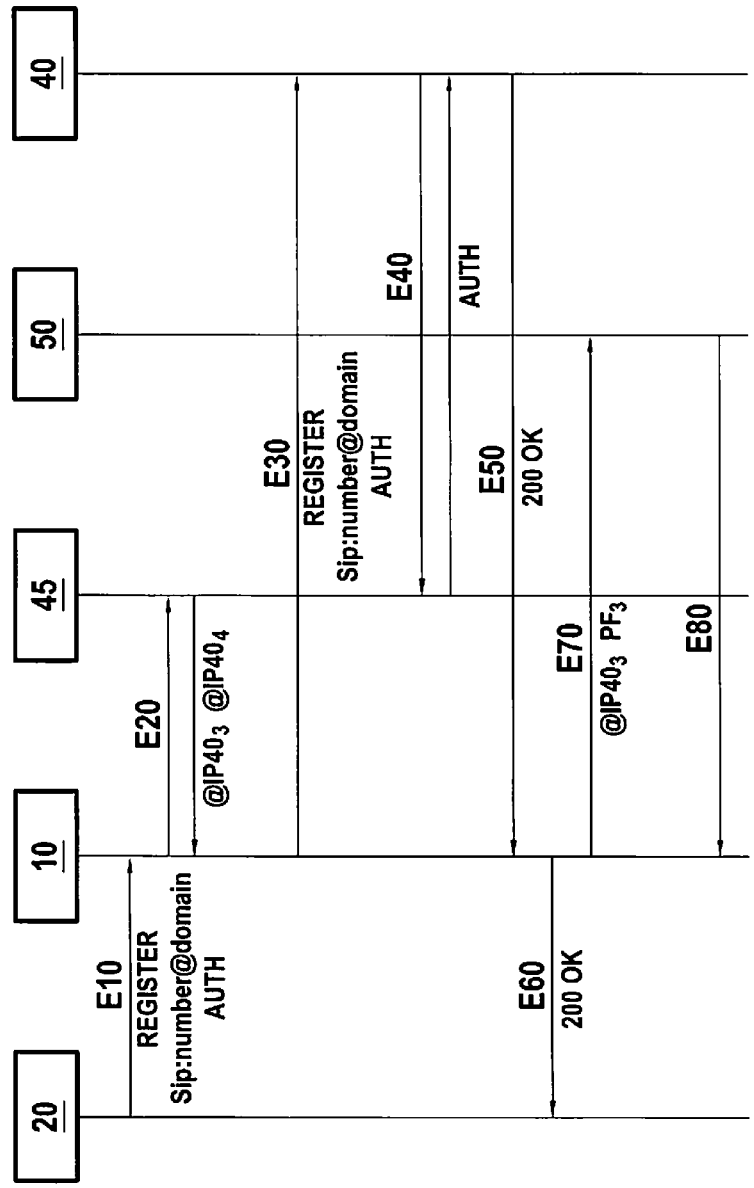
FIG. 2 shows the main steps of a procedure for registering a voice over IP terminal in accordance with an implementation.

FIG. 2 shows the main steps of a procedure for registering a voice over IP terminal 20 with a VoIP platform $40_i$ in accordance with an implementation.

During a step E10, the voice over IP terminal 20 sends a registration request to the proxy device 10. This request is a request of the REGISTER type. It includes the address sip:number@domain of the terminal 20 together with the user's authentication data AUTH (identifier, password). This registration request is received by the proxy device 10 during the same step E10.

During a step E20, the proxy server 10 interrogates the user database 45, e.g. by using a hypertext transfer protocol (HTTP) request in order to obtain the IP address of the VoIP platform 40i with which the proxy device 10 is to register. For this purpose, it communicates the SIP number of the voice over IP terminal 20.

During this same step E20, the proxy device 10 obtains in response the IP address of the nominal platform, e.g. of the VoIP platform $40_3$ together with at least one IP address of a backup VoIP platform associated with the voice over IP terminal 20, e.g. the VoIP platform $40_4$. The proxy device 10 stores the addresses of these platforms to make it possible, in particular, subsequently:

to route outgoing calls initiated by the voice over IP terminal 20, as described with reference to FIG. 4; and to switch the nominal platform (e.g. $40_3$) over to a backup platform (e.g. $40_4$) in the event of the nominal platform malfunctioning, as described with reference to FIG. 5.

During a step E30, the proxy device 10 registers with the nominal VoIP platform $40_3$ if it is available, by sending a REGISTER request to that platform including the data received in the REGISTER request in step E10. If the nominal platform is not available, it registers with one of the backup VoIP platforms for which it has received the address.

During a step E40, the VoIP platform $40_3$ interrogates the database 45 in order to obtain in particular the authentication data AUTH of the user of the voice over IP terminal 20, i.e. the user's identifier and password.

If the authentication data obtained from the database 45 corresponds to the authentication data received in the registration request in step E30, the VoIP platform $40_3$ acts during a step E50 to send a 200 OK type response to the proxy device 10 in order to acknowledge the REGISTER request received in step E30.

On receiving this response, the proxy device 10 sends (step E60) a 200 OK response in order to acknowledge the REGISTER request received in step E10.

During a step E70, the proxy device 10 sends to the application NPS server 50 a request (e.g. an HTTP request) including:
the IP address of the VoIP platform with which the voice over IP terminal 20 is registered, specifically the IP address of the VoIP platform $40_3$; and
the telephone number of the voice over IP terminal 20.

On receiving this request, the application NPS server 50 updates its NPS database 55 by associating the telephone number of the voice over IP terminal 20 with the routing prefix $PF_3$ of the voice over IP platform $40_3$.

The application NPS server responds to this request during the same step E80.

Figure 3:
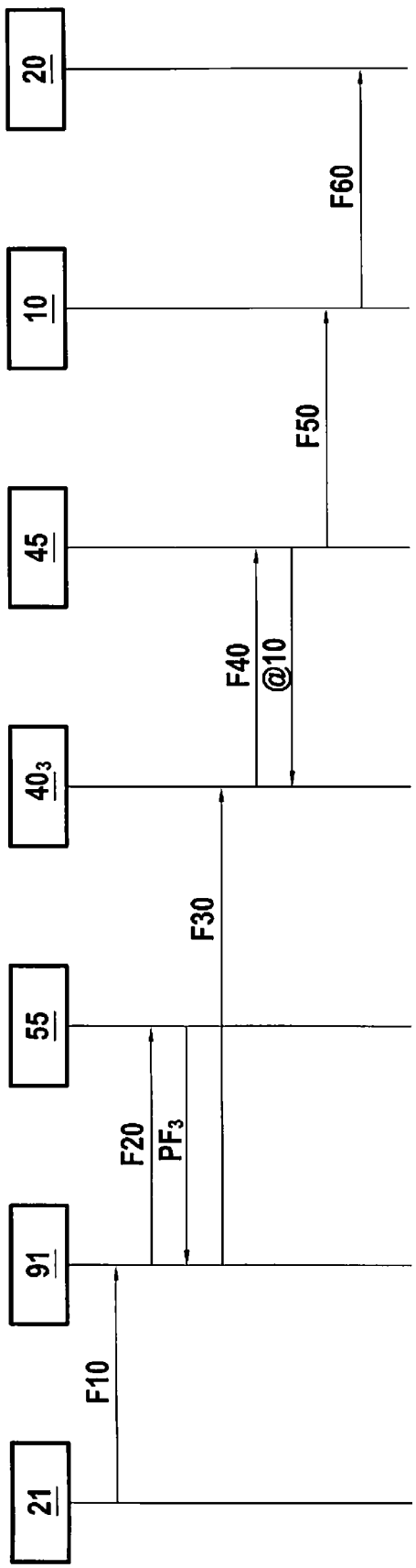
FIG. 3 shows the main steps of processing an incoming call in accordance with an implementation.

FIG. 3 shows the main steps of processing an incoming call issued by a voice over IP terminal 21 of the network 91 to a voice over IP terminal 20 of one of the sites S1, S2, or S3 in an implementation.

It is assumed that the call issued by the voice over IP terminal 21 is presented to the voice over IP SIP telephone network 91 during a step F10.

During a step F20, the gateway 90 interrogates the NPS database 55 in order to discover the routing prefix for the requested number. This number was included in the database 55 during the step E70 of the above-described registration procedure. It corresponds to the routing prefix $PF_3$ of the VoIP platform $40_3$ allocated by the proxy device 10 to the voice over IP terminal 20.

The operator's voice over IP network OPNet routes the call to the VoIP platform $40_3$ (step F30).

During a step F40, the VoIP platform $40_3$ interrogates the user database 45 to retrieve the information about the called user and in particular the address of the proxy device 10 to which the call should be routed.

During a step F50, the VoIP platform $40_3$ routes the call to that proxy device 10.

The proxy device 10 routes the call to the called voice over IP terminal 20 during a step F60.

Figure 4:
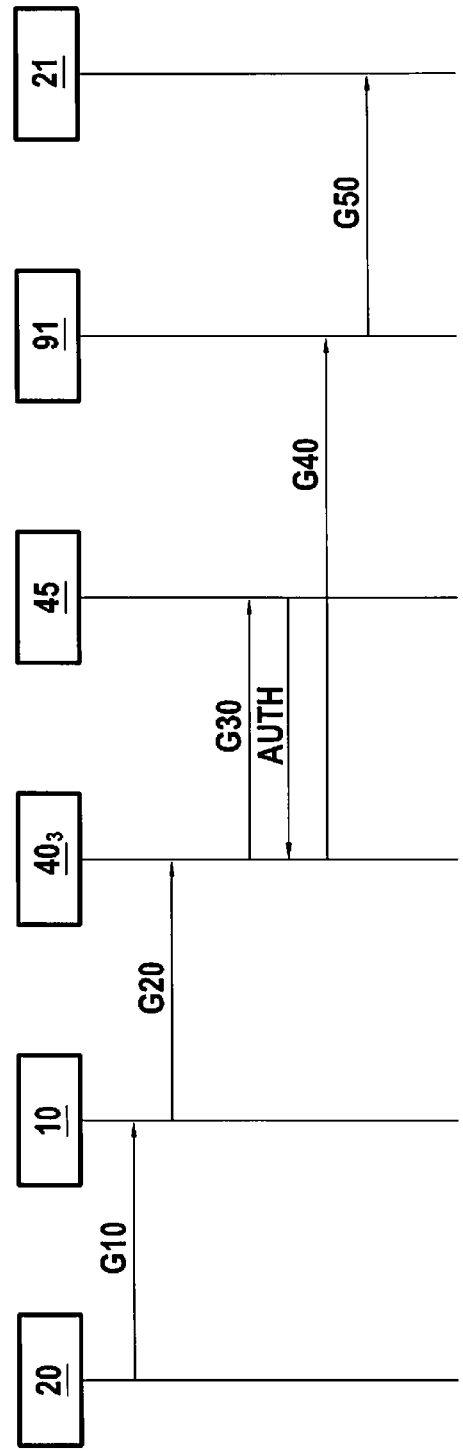
FIG. 4 shows the main steps of processing an outgoing call in accordance with an implementation.

FIG. 4 shows the main steps of processing an outgoing call initiated by a voice over IP terminal 20 to the voice over IP terminal 21 connected to the voice over IP SIP network 91 in accordance with an implementation.

It is assumed that the voice over IP terminal 20 has previously sent to the proxy device 10 a registration request REGISTER including the address sip:number@domain of the terminal 20 together with the authentication data AUTH (identifier, password) of the user of the terminal 20, as described above with reference to step E10, and that the terminal 20 sends a call initiation request INVITE to the proxy device 10 during a step G10.

During a step G20, the proxy device 10 routes the call to the VoIP platform $40_3$ for which it received the identifier during the step E20 of the above-described registration procedure.

During a step G30, the VoIP platform $40_3$ interrogates the user database 45 in order to retrieve the authentication data AUTH of the user of the calling terminal 20 so as to verify that the user initiating the call is authorized to send calls over the network OPNet.

During a step G40, the VoIP platform $40_3$ routes the call to the voice over IP telephone network 91.

This network 91 routes the call to the called voice over IP terminal 21 during a step G50.

Figure 5:
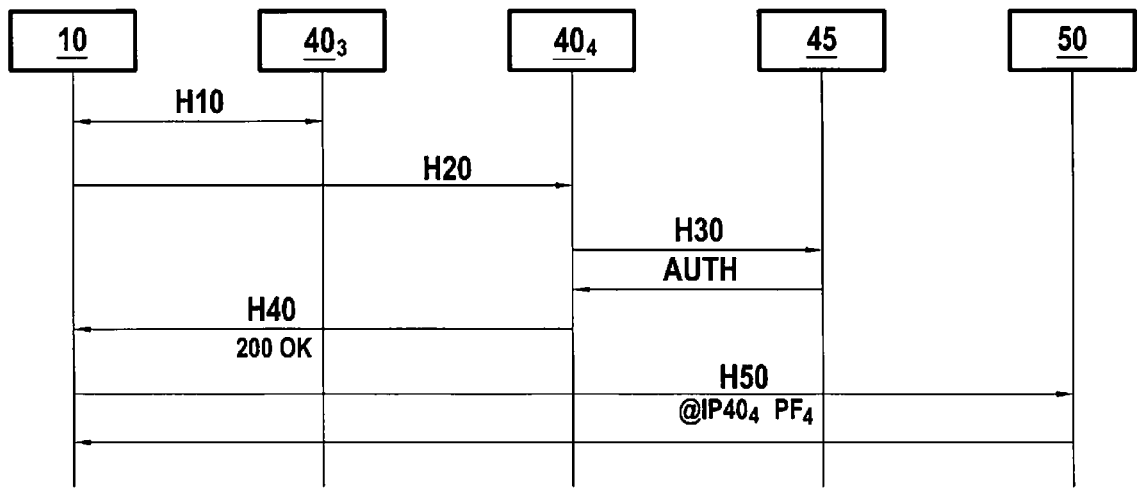
FIG. 5 shows the main steps of a procedure for switching over from a nominal VoIP platform to a backup VoIP platform in accordance with an implementation.

FIG. 5 shows the main steps of a procedure for switching a nominal VoIP platform $40_3$ over to a backup VoIP platform ($40_4$) in accordance with an implementation.

During a step H10, the proxy device 10 detects that the nominal VoIP platform $40_3$ with which it was registered in step E30 is no longer usable. This state is detected when the proxy device 10 does not receive a response within a predetermined length of time measured from sending a request of the REGISTER or INVITE type.

During a step H20, the proxy device 10 registers with a backup VoIP platform for which it received the identifier during above-described step E20, e.g. the VoIP platform $40_4$. This step is similar to above-described step E30.

During a step H30, identical to above-described step E40, the backup VoIP platform $40_4$ interrogates the database 45 in order to obtain the authentication data AUTH of the user of the voice over IP terminal 20, and in particular the user's identifier and password.

Once this information has been obtained, the backup VoIP platform $40_4$ acts during a step H40 to send a 200 OK type response to the proxy device 10 in order to acknowledge the REGISTER request received in step H20.

During a step H50, identical to above-described step E70, the proxy device 10 sends a request to the application NPS server 50 in order to inform it of the backup VoIP platform 40 with which the voice over IP terminal 20 is registered. On receiving this request, the application NPS server 50 updates the NPS database 55 by associating the telephone number of the voice over IP terminal 20 with the routing prefix $PF_4$ of the backup VoIP platform $40_4$. The application NPS server responds to this request during the same step H50.

Figure 6:
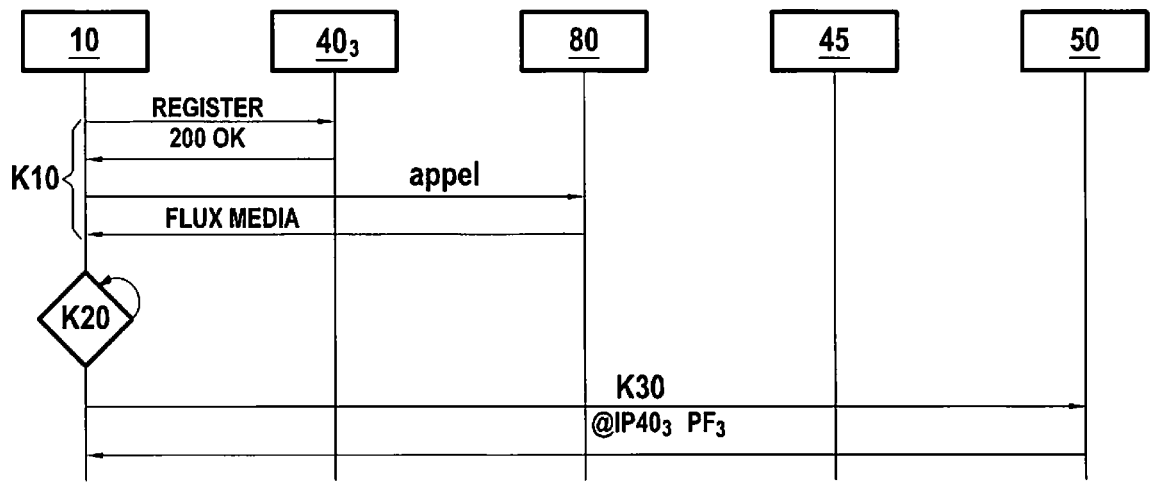
FIG. 6 shows the main steps of a procedure for returning to nominal mode in accordance with an implementation.

FIG. 6 shows the main steps of a procedure for returning to the nominal mode in accordance with an implementation.

During a step K10, the proxy device 10 tests the state of its nominal VoIP platform $40_3$. To do this, it registers with the platform and then sends a call to the answer-back server 80 of the VoIP network. If the server 80 receives this call, it answers it and sends a media stream to the proxy device 10. If the proxy device 10 receives this media stream, it considers that the nominal VoIP platform $40_3$ is in a state of normal operation.

During a step K20, the proxy device 10 waits until there is no ongoing call.

During a step K30, identical to the above-described step E70, the proxy device 10 sends a request to the application NPS server 50 in order to inform it that it is registered with the nominal platform 40. On receiving this request, the application NPS server 50 updates the NPS database 55 by associating the telephone number of the voice over IP terminal 20 with the prefix $PF_3$ of the nominal voice over IP platform 40₃. The application NPS server 50 responds to this request during the same step K30.

Figure 7:
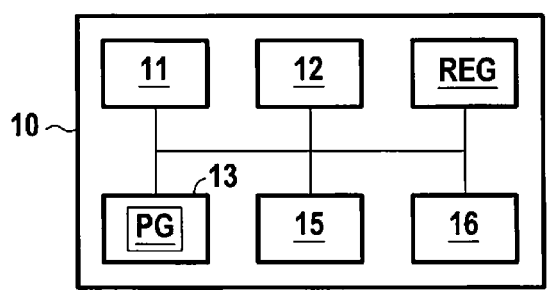
FIG. 7 shows the hardware architecture of a proxy device in accordance with an embodiment.

In the presently-described embodiment, the proxy device 10 has the hardware architecture of a computer. With reference to FIG. 7, the proxy device 10 comprises in particular a processor 11, random access memory (RAM) 12, ROM 13, first communication capability 15 for communicating with the voice over IP devices of the LAN, and second communication capability 16 for communicating with equipment of the operator's network OPNet.

The proxy device 10 also has a REGISTRAR type module REG for registering the SIP proxy 10 with a said voice over IP platform 40ᵢ.

The ROM 13 constitutes a data medium in accordance with embodiments described herein. It stores a computer program PG in accordance with embodiments described herein and suitable for performing the main steps of a call management method as described above.

The first communication capability 15 is configured to be capable of receiving registration requests issued by the voice over IP terminals 20 in order to register with a voice over IP platform 40ᵢ.

The second communication capability 16 is configured to be capable of obtaining, from the database, the address of at least one voice over IP platform associated with the SIP proxy.

The second communication capability 16 is also configured to be capable of sending the above-mentioned registration request to the number portability server 50.

The first communication capability 15 and the second communication capability 16 are configured to convey outgoing and incoming VoIP calls.

By performing the computer program PG, the processor 11 is suitable for detecting a failure affecting a VoIP platform 40ᵢ, for switching over to a backup VoIP platform when such a failure is detected, and for returning to nominal mode when the nominal VoIP platform is in a nominal state of operation.

In the foregoing description, specific details are given to provide a thorough understanding of the examples. However, it will be understood by one of ordinary skill in the art that the examples may be practiced without these specific details. Certain features that are described separately herein can be combined in a single embodiment, and the features described with reference to a given embodiment also can be implemented in multiple embodiments separately or in any suitable subcombination.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A call management method of managing calls in a voice over IP (VoIP) network, the method being performed by a session initiation protocol (SIP) proxy and comprising:
   receiving a registration request output by a VoIP terminal, the registration request comprising a request to register with the SIP proxy, the VoIP terminal outputting the registration request not currently having an active registration with the SIP proxy;
   obtaining from a database the address of at least one VoIP platform associated with the VoIP terminal, wherein obtaining the address of at least one VoIP platform associated with the VoIP terminal comprises using an SIP number of the terminal;
   registering the SIP proxy with a VoIP platform of the at least one voice over IP platform; and
   sending a request to a number portability server configured to manage incoming calls to the VoIP terminal, the request causing the server to associate the telephone number of the VoIP terminal with a routing prefix associated with the VoIP platform.

2. The method of claim 1, wherein obtaining from a database the address of at least one VoIP platform associated with the VoIP terminal comprises obtaining from the database the address of a nominal VoIP platform and the address of at least one backup VoIP platform associated with the VoIP terminal, registering the SIP proxy being performed in preferred manner with the nominal VoIP platform, and in the event of a failure, with a backup VoIP platform of the at least onebackup VoIP platforms in a priority order associated with the at least one backup VoIP platform.

3. The method of claim 1, further comprising routing to the VoIP terminal an incoming call for the terminal as received from the VoIP platform with which the proxy device is registered.

4. The method of claim, 1 further comprising:
   receiving a call output by the VoIP terminal; and
   routing the call to the VoIP platform with which the proxy device is registered.

5. A non-transitory computer-readable data medium having stored thereon instructions, which when executed by a processor, cause the processor to perform the call management method of claim 1.

6. The method of claim 1, wherein the registration of the SIP proxy with a VoIP platform of the at least one VoIP platform occurs after the obtaining of the address of the at least one VoIP platform associated with the VoIP terminal.

7. The method of claim 1, wherein the registration request comprises a REGISTER request.

8. The method of claim 1, wherein the registration request output by the VoIP terminal comprises identification data of a user of the VoIP terminal, and wherein registering the SIP proxy with a VoIP platform of the at least one voice over IP platform comprising using the authentication data of the user of the VoIP terminal.

9. The method of claim 2, further comprising:
   detecting a fault affecting the VoIP platform with which the proxy device is registered;
   registering the SIP proxy with a backup VoIP platform of the at least onebackup VoIP platforms in the priority order; and
   sending a request to the number portability server requesting the server to associate the telephone number of the VoIP terminal with a routing prefix associated with the backup VoIP platform.

10. The method of claim 6, wherein the obtaining of the address of at least one VoIP platform associated with the VoIP terminal is performed after receiving the registration request output by the VoIP terminal.

11. The method of claim 9, further comprising:
   detecting a state of normal operation of the nominal VoIP platform;
   waiting until the proxy device is no longer managing a call; and sending a request to the number portability server requesting the server to associate the telephone number of the VoIP terminal with a routing prefix associated with the nominal VoIP platform.

12. A session initiation protocol (SIP) proxy, comprising:
a memory;
a processor, the processor configured by the memory to:
  receive a registration request output by a voice over IP (VoIP) terminal, the registration request comprising a request to register with the SIP proxy, the VoIP terminal outputting the registration request not currently having an active registration with the SIP proxy;
  obtain from a database the address of at least one VoIP platform associated with the VoIP terminal, wherein the address of at least one VoIP platform associated with the VoIP terminal is obtained using an SIP number of the terminal;
  register the SIP proxy with a VoIP platform of the at least one VoIP platform; and
  send a request to a number portability server suitable for managing incoming calls to the VoIP terminal, which request causes the server to associate the telephone number of the VoIP terminal with a routing prefix associated with the VoIP platform.

13. The SIP proxy of claim 12, wherein the processor is configured to register the SIP proxy with a VoIP platform of the at least one VoIP platform after obtaining the address of the at least one VoIP platform associated with the VoIP terminal.

14. The SIP proxy of claim 12, wherein the registration request comprises a REGISTER request.

\* \* \* \* \*